United States Patent [19]
Takeda et al.

[11] Patent Number: 5,400,611
[45] Date of Patent: Mar. 28, 1995

[54] REFRIGERATING CYCLE MACHINE

[75] Inventors: Kimiharu Takeda; Tetuzou Ukai; Kazuhiro Suzuki, all of Aichi; Kazuhiro Sato, Nagoya, all of Japan

[73] Assignee: Mitsubishi Jukogyo Kabushiki Kaisha, Tokyo, Japan

[21] Appl. No.: 223,736

[22] Filed: Apr. 6, 1994

[30] Foreign Application Priority Data

Aug. 30, 1993 [JP] Japan .................. 5-213990

[51] Int. Cl.⁶ .............................................. F25B 49/02
[52] U.S. Cl. ........................................ 62/158; 62/181; 62/228.4
[58] Field of Search ............... 62/157, 158, 180, 181, 62/182, 183, 184, 228.3, 228.4, 228.5, 186, 231, DIG. 17

[56] References Cited

U.S. PATENT DOCUMENTS

| | | | |
|---|---|---|---|
| 4,136,730 | 1/1979 | Kinsey | 62/231 X |
| 4,750,672 | 6/1988 | Beckey et al. | 62/108 X |
| 4,901,534 | 2/1990 | Nakatsuno et al. | 62/228.4 X |
| 5,285,646 | 2/1994 | TaeDuk | 62/158 X |
| 5,309,730 | 5/1994 | Strand et al. | 62/228.4 |

*Primary Examiner*—Harry B. Tanner
*Attorney, Agent, or Firm*—Jacobson, Price, Holman & Stern

[57] ABSTRACT

A refrigerating cycle machine characterized by comprising hardware or software means for raising the speed of rotation of the compressor or stopping the fan for producing an air current through the condenser when the operation of the machine is turned off and stopping the operation of the machine when a predetermined time has elapsed. This increases the suction and discharge pressure difference to such an extent that generates a sufficiently high pressure difference between both sides of the valve body to move the valve body toward the closing position surpassing the sticking force when the machine stops.

2 Claims, 6 Drawing Sheets

$Po = Ps \cdot Vi^K$

REFRIGERATING CYCLE MACHINE

FIELD OF THE INVENTION AND RELATED ART

This invention relates to a refrigerating cycle machine which comprises a compressor having a compressing mechanism provided with a check valve in the outlet and other elements of a refrigerating cycle system connected in a closed loop.

Recently, a scroll compressor is more and more widely used for air conditioners (an application of a refrigerating cycle machine) for its high performance.

A scroll compressor has a compressing mechanism h which consists of a stationary scroll d having an end plate a, spiral wrap b perpendicularly projecting from the inside surface of the end plate a, and circumferential wall c surrounding the wrap b, and a rotary scroll g having an end plate e and spiral wrap f perpendicularly projecting from the inside surface of the end plate e, as shown in FIGS. 5 and 6.

The stationary scroll d and rotary scroll g are fitted together with their wraps b and f being engaged with each other at a predetermined angle to form sealed spaces i for compression between the wraps b and f.

The rotary scroll g revolves around the center of the stationary scroll d, e.g., driven by an inverter-controlled motor (not shown) via a driving shaft m with an eccentric pin k on the top end.

By this revolution of the rotary scroll g around the center of the stationary scroll d, the sealed spaces i move from the peripheral portion to the central portion, becoming smaller in volume. Compression of a gas is accomplished utilizing the decrease of the volume of the sealed spaces i.

The rotary scroll g is provided with means for preventing the rotation of the rotary scroll g around its center such as Oldham's ring, though not shown.

An air conditioner (closed loop refrigerating cycle) is constructed by connecting an outdoor heat exchanger with an outdoor fan, expansion valve, indoor heat exchanger with an indoor fan and other elements of a refrigerating system (all not shown) to the compressor h.

The compressor h is commonly provided at the outlet port n with a check valve o for preventing a return flow.

A valve of free valve body type is used for the check valve o because of its simple construction.

A check valve o of free valve body type consists of a valve chamber p formed at the middle of the outlet port n, upstream and downstream valve seats q and r formed using the upstream and downstream end wall surfaces of the valve chamber p, and a valve body s put in the valve chamber p and free to move between these valve seats.

The valve body s is pressed to the downstream valve seat r to open the outlet port when the pressure of the discharged gas is applied from upstream, and pressed to the upstream valve seat q to close the outlet port when the pressure of the discharged gas is applied from downstream.

The check valve o closes the outlet port n and thereby prevents a return flow of the gas into the compressor h and the reverse rotation of the compressor caused by the return flow.

The valve body s at the downstream valve seat r is pressed toward the upstream valve seat q by the force generated by the pressure difference Pd-Po between both sides of the valve body s when the compressor h stops. Here, Pd is the pressure of the discharged gas at the downstream side of the valve body s at the downstream valve seat r as shown in imaginary lines in FIG. 5, and Po the pressure of the gas in the valve chamber p. The pressure difference Pd-Po is known to change according to the suction and discharge pressure difference $\Delta P$ (Pd-Ps, Ps: Suction pressure).

The pressure difference Pd-Po is smaller when the compressor was operated at a low speed of rotation (small $\Delta P$) as in the drying operation or cooling operation under a little temperature difference between the inside and outside air.

The valve body s is stuck to the valve seat r by the oil contained in the refrigerant gas.

Therefore, the valve body s does not quickly move to the closing position when the air conditioner is stopped with a small suction and discharge pressure difference $\Delta P$ and the pressure difference Pd-Po is not sufficiently large to move the valve body s surpassing the sticking force.

A return flow of the gas into the compressor h through the outlet port n occurs because of the delayed close of the check valve o and causes the reverse rotation of the compressor h producing a large noise.

OBJECTS AND SUMMARY OF THE INVENTION

This invention was made in such a back ground. The object of this invention is therefore to provide a refrigerating cycle machine which can prevent the delayed close of the check valve.

To accomplish the above object, the refrigerating cycle machine defined in claim 1 has means for raising the speed of rotation of the compressor when the operation of the machine is turned off and means for stopping the operation of the machine when the high speed operation of the compressor is maintained for a predetermined time.

The refrigerating cycle machine defined in claim 2 has means for stopping the fan for producing an air current through the condenser and means for stopping the operation of the machine when a predetermined time has elapsed after the fan was stopped.

In the refrigerating cycle machine of claim 1, the speed of rotation of the compressor is raised before the operation of the machine is stopped, and the operation of the machine is stopped after the compressor is operated at the high speed of rotation for a predetermined time.

By this high speed operation of the compressor, the suction and discharge pressure difference is increased to such an extent that generates a sufficiently high pressure difference between both sides of the valve body to move the valve body toward the closing position surpassing the sticking force when the machine stops.

In the refrigerating cycle machine of claim 2, the fan for producing an air current through the condenser is stopped before the operation of the machine is stopped, and the operation of the machine is stopped after the fan for the condenser is stopped for a predetermined time.

By thus stopping the operation of the fan at the condenser side, the gas pressure rises at the upstream side of the condenser because of the decreased heat exchange efficiency, resulting in an increase of the suction and discharge pressure difference. The suction and discharge pressure difference is thus increased to such an extent that generates a sufficiently high pressure difference between both sides of the valve body to move the valve body toward the closing position surpassing the sticking force when the machine stops.

This invention, as described above, can solve the problem of the delayed close of the check valve which causes the reverse rotation of the compressor in conventional refrigerating cycle machines.

DETAILED DESCRIPTION OF PREFERRED EMBODIMENTS

Figure 1:
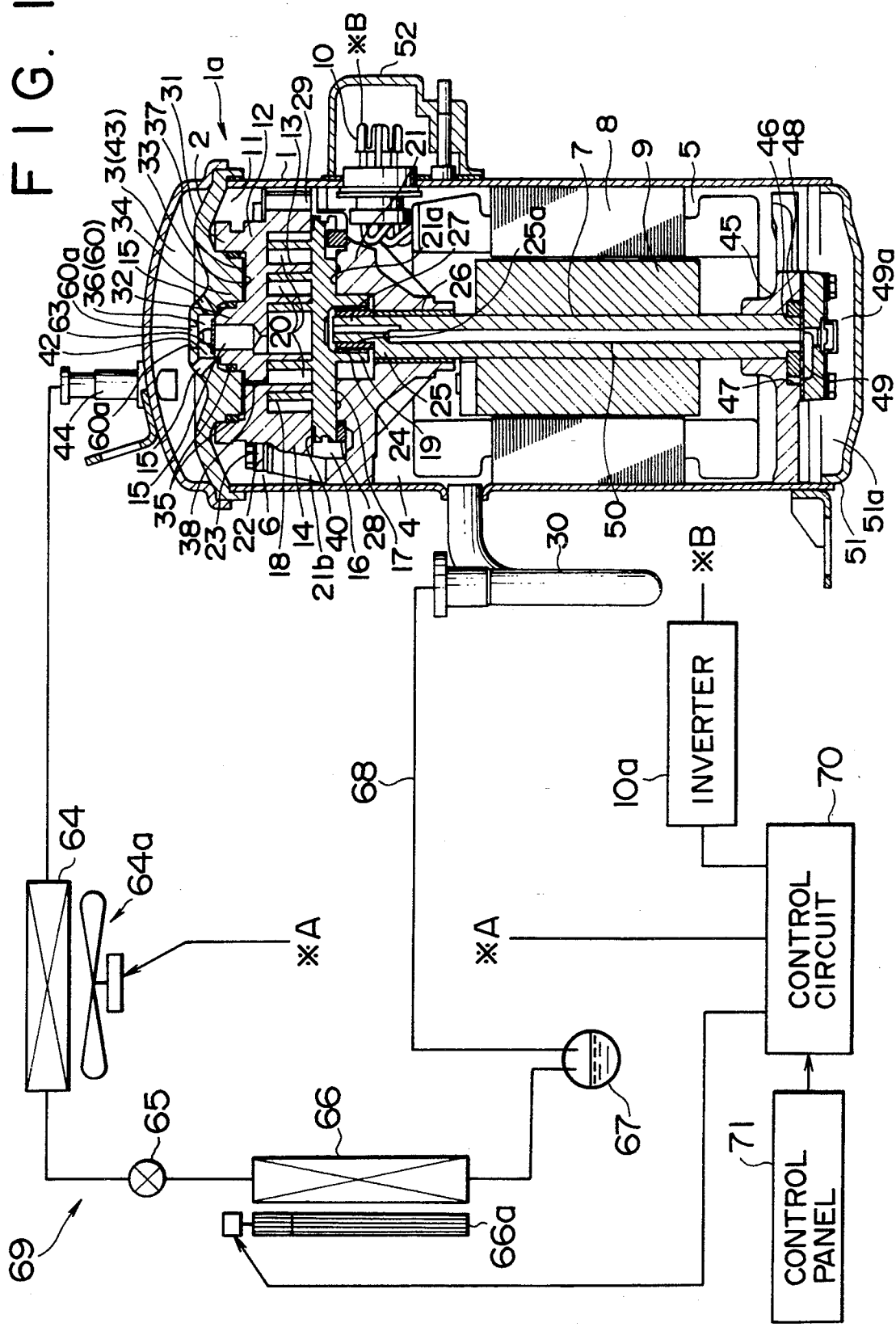
FIG. 1 is a diagram showing the overall construction of the air conditioner of the first embodiment of this invention.
Figure 3:
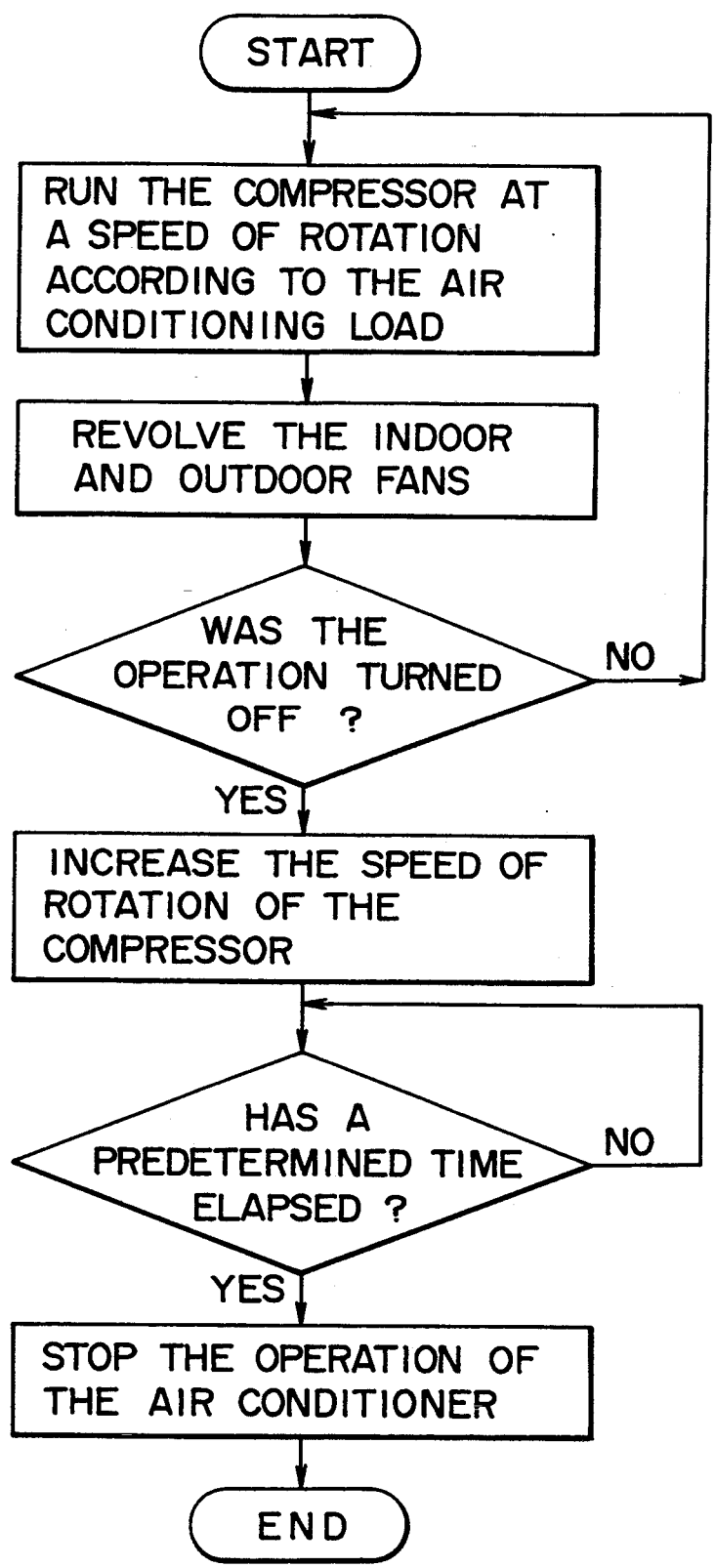
FIG. 3 is a flowchart showing the control of the operation of the compressor for the first embodiment.

Hereinafter, the present invention is described referring to an embodiment shown in FIGS. 1 and 3. FIG. 1 shows the overall construction of an air conditioner using the refrigerating cycle machine of the present invention. In this embodiment, reference numeral 1a designates a scroll compressor (enclosed compressor). The scroll compressor 1a comprises an enclosing housing 1 formed in a vertically extending hollow cylinder.

A discharge cover 2 is provided near the upper end of the housing 1 to partition the inside of the housing 1 into the upper high pressure section 3 and lower low pressure section 4.

In the low pressure section 4 of the housing 1, a motor 5 is disposed at the lower part and a compressing mechanism 6 at the upper part.

The motor 5 has a stator 8 secured in the housing 1 and a rotor 9 mounted on the shaft 7 in the stator 8. The terminals 10 of the windings of the stator 8 are disposed on the circumferential surface of the housing 1 and connected to an inverter 10a.

The compressing mechanism 6 consists of a stationary scroll 11 and a rotary scroll 16, made of aluminum and fitted together.

The stationary scroll 11 has an end plate 12, spiral wrap 13 perpendicularly projecting from the inside surface of the end plate 12 (similar to the wrap shown in FIG. 6), and circumferential wall 14 surrounding the wrap 13. It also has an outlet port 15 at the center of the end plate 12.

Figure 6:
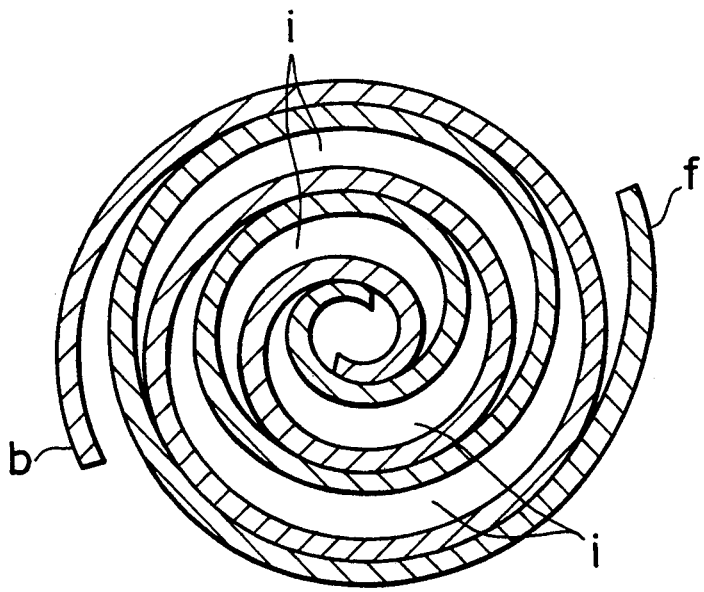
FIG. 6 is a sectional view which shows the engagement of the stationary and rotary wraps.
Figure 7:
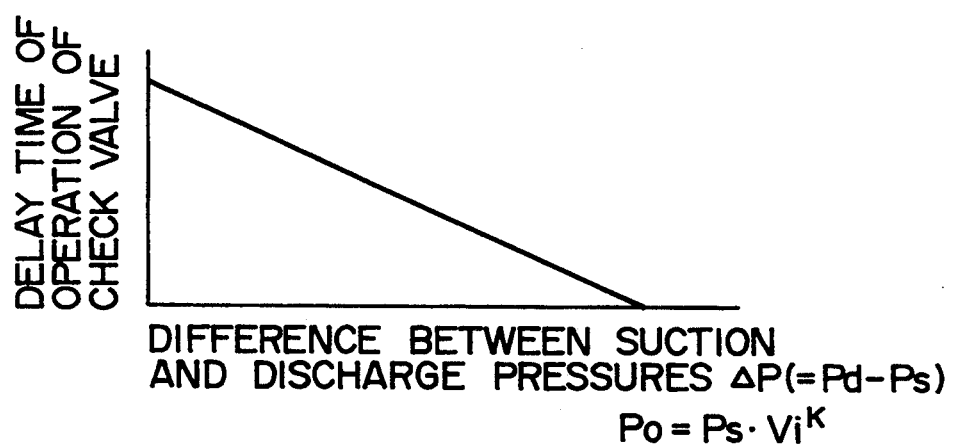
FIG. 7 is a graph showing the delay time of the closing operation of the check valve versus the suction and discharge pressure difference.

The rotary scroll 16 has an end plate 17 and spiral wrap 18 perpendicularly projecting from the inside surface of the end plate 17 (similar one to the wrap shown in FIG. 6). It has a boss 19 at the center of the outside surface of the end plate 17.

The stationary scroll 11 and rotary scroll 16 are fitted together with their wraps 13 and 18 engaged with each other at a predetermined angle, 180 degrees for example. A plurality of sealed spaces 20 in the shape of a crescent are formed by the end plates 12 and 17 and wraps 13 and 18 (closed spaces between two wraps as shown in FIG. 6), which confine the refrigerant gas, compress it as they become smaller in volume, and push it out into the outlet port 15.

The scrolls 11 and 16 thus fitted together are held between the discharge cover 2 and a main frame 21 at the upper part of the low pressure section 4 serving as the casing, with the stationary scroll 11 at the upper side and the rotary scroll 16 at the lower side.

The end plate 17 of the rotary scroll 16 is slidably supported by the horizontal supporting surface 21a formed in the upper side of the main frame 21.

The stationary scroll 11 is secured to supports 21b projecting from the peripheral part of the main frame 21 movably in the vertical direction, being pressed by springs 22 to the rotary scroll 16. In more detail, the stationary scroll 11 has brackets 23 radially projected from the circumference of the end plate 12. The brackets are secured to the top of the supports 21b with the springs 22 inserted between the brackets 23 and supports 21b.

An inlet port (not shown) provided in the circumferential wall 14 of the stationary scroll 11 is connected with an inlet pipe 30 via the space 29 around the circumferential wall 14, an opening (not shown) in the main frame 21, and the low pressure section 4 so that the refrigerant gas can flow into the compressing mechanism 6 from the outside of the housing.

The shaft 7 is extended upward to just below the bottom end of the boss 19 of the rotary scroll 16. The top end portion of the shaft 7 is rotatably supported by an upper bearing 26 in the hole of the main frame 21. The top end of the shaft 7 is provided with an eccentric pin 27 projecting upward. The eccentric pin 27 is received in the hole 25a of a bush 25 rotatably held via a bearing 24 in the hole of the boss 19. By this construction, the rotary scroll 16 revolves around the center of the stationary scroll 11 (center of the shaft 7) driven by the eccentric pin 27.

The rotation of the rotary scroll 16 around its center is prevented by appropriate means, such as an Oldham's ring which permits the revolution of the rotary scroll 16 around the center of the shaft 17 but prevents the rotation of the rotary scroll 16 around its center, put between the end plate 17 of the rotary scroll 16 and the supporting surface 21a of the main frame 21.

By the revolution of the rotary scroll 16 around the center of the shaft 17, the sealed spaces 20 shift from the peripheral portion to the center, becoming smaller in volume. The refrigerant gas is thereby compressed and pushed out into the outlet port 15.

The end plate 12 has on its top side inner and outer cylindrical projections 31 and 32 extending upward coaxially with the end plate 12.

The discharge cover 2 has a cylindrical projection 34 which extends downward and fits in the annular recess 33 formed between the projections 31 and 32.

U seals 35 are inserted in the annular spaces between the circumferential surfaces of the projection 34 and each of the projections 31 and 32 to seal in the gas-tight fashion permitting the vertical motion of the stationary scroll 11.

A space 36 is formed between the top end of the inner cylindrical projection 32 of the end plate 12 and the central portion of the discharge cover 2. The space 36 communicates with the outlet port 15 in the end plate 12 and is sealed by the inner U seal 35 to form a high pressure space. The space 37 between the discharge cover 2 and the end plate 12 around the high pressure space, sealed by the inner and outer U seals, is communicated via a pressure-introducing opening in the end plate 12 with a sealed space 20 in the middle course of compression and forms an intermediate pressure space.

Therefore, the pressure of the refrigerant gas in the high pressure space becomes the discharge pressure and that in the space 37 an intermediate pressure, and the pressure of the refrigerant gas in the space 36 and space 37 cancels the pressure of the refrigerant gas inside the compressing mechanism 6 and thereby prevents the stationary scroll 11 from being pushed up by the inside pressure.

An annular abrasion-resistant plate 40 formed of a hard material is inlaid in the peripheral portion of the inside surface of the end plate 17 of the rotary scroll 16 which comes in sliding contact with the bottom end of the circumferential wall 14 of the stationary scroll 11. The abrasion-resistant plate 40 prevents the rapid abrasion of the inside surface of the end plate 12 by the circumferential wall 14 due to the force acting on the stationary scroll 11 so as to tilt it during operation.

The outlet port 15 in the end plate 12 extends through the space 36 to the discharge cover 1 and there divides into a plurality of branches formed in the discharge cover 1 radially around the space 36. Each of the branches 15 is open in the high pressure section 3 serving as the discharge chamber 43.

A check valve 42 for preventing a return flow of the refrigerant gas is put in the outlet port 15. A valve of free-valve body type is used for the check valve 42. The construction of the check valve 42 and the portion around it is shown in FIG. 2 in an enlarged sectional view.

Figure 2:
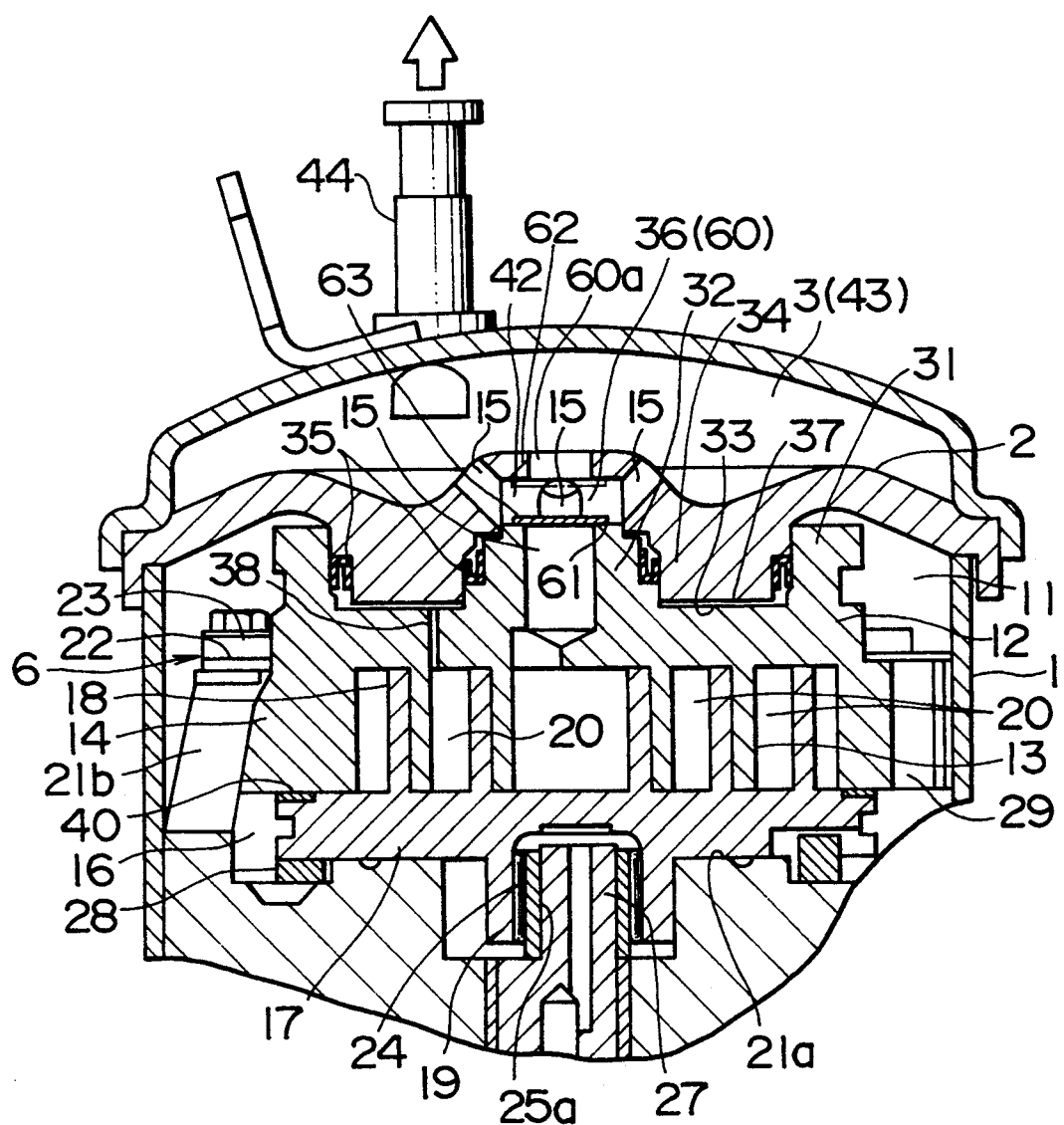
FIG. 2 is an enlarged sectional view showing the construction of the check valve and the portion around it of the compressor.

In the construction of the check valve 42 shown in FIG. 2, the space 36 forms the valve chamber 60. The valve chamber 60 has the form of a cylinder with a diameter larger than that of the outlet port 15 in the end plate 12. The outlet port 15 in the end plate 12 opens at the upstream end of the valve chamber 60, and the branched downstream portion of the outlet port 15 extend from the circumference of the valve chamber 60 to the discharge chamber 43.

The upstream end surface of the valve chamber 60 serves as the first valve seat 61 (closed position) and the downstream end surface as the second valve seat 62 (open position).

A valve body 63 in the shape of a disc is movably put in the valve chamber 60 and free to shift between the first and second valve seats 61 and 62.

By this construction, the valve body 63 is pressed to the downstream second valve seat 62 to open the outlet port 15 when the pressure of the discharged gas is applied from upstream, while it is pressed to the upstream first valve seat 61 to close the outlet part 15 when the pressure of the return gas is applied from downstream.

The check valve 42 thus closes the outlet port 15 to prevent a return flow of the refrigerant gas when the operation of the compressor 1a is stopped.

An opening 60a, which communicates the valve chamber 60 with the discharge chamber 43, is formed in the downstream end wall of the valve chamber 60. The opening 60a allows the gas pressure in the discharge chamber 43 to be applied to the back side of the valve body 63 at the second valve seat 62 and move the valve body 63 toward the first valve seat 61 when the operation of the compressor 1a is stopped.

An outlet pipe 44 is disposed on the outside surface of the top wall of the housing 1. The discharge chamber 43 communicates with the outlet pipe 44, and the gas in the discharge chamber 43 flows out through the outlet connector 44.

The bottom end portion of the shaft 7 extends toward the bottom wall of the housing 1 and is rotatably supported by a lower frame 45 at the lower part of the low pressure section 4.

An oil pump 49 is formed on the bottom side of the lower frame 45. In this embodiment, the oil pump 49 is a rotary plunger pump using a mechanism which comprises an eccentric rotor 46 rotated by the shaft 7 and a ring 48 slidably fitted around the eccentric rotor 46 and forces out oil by the plunging motion of the ring 48. Any other type of pump may be used for the oil pump 49. The inlet (not shown) of the oil pump 49 communicates with the oil reservoir 51 formed by the bottom portion of the housing 1 and sucks the oil 51a in the oil reservoir 51. The outlet of the oil pump 49 communicates with the portions in sliding contact of the compressing mechanism 6 through the oil hole 50 formed in the shaft 7 to supply oil to the portions to be lubricated.

The outlet of the oil pump 49 is also provided with a relief valve 49a for returning oil to the oil reservoir 51 when the oil pressure exceeds a predetermined limit.

Further, designated by reference numeral 52 is a terminal cover which encloses the terminals 10 disposed on the outside surface of the housing 1.

Between the outlet pipe 44 and inlet pipe 30 of the scroll compressor 1a constructed as described above, elements of a refrigerating cycle system is connected in a closed loop to form an air conditioning system 69 comprising an outdoor heat exchanger 64 (condenser), expansion valve 65, indoor heat exchanger 66 (evaporator) and accumulator 67.

The outdoor heat exchanger 64 includes an outdoor fan 64a (fan at the condenser side) for accelerating heat exchange between the heat exchanger and outside air. The indoor heat exchanger 66 includes an outdoor fan 66a (fan at the evaporator side) for accelerating heat exchange between the heat exchanger and the air in the room. The indoor fan 66a serves for circulating the air in the room through the heat exchanger.

Reference numeral 70 designates a microprocessor-based control circuit. The control circuit 70 is connected to the control panel (or remote control unit) 71 operated to turn on and off the operation, set the temperature, and so on, the inverter 10a, outdoor fan 64a, and indoor fan 66a.

The control circuit 70 has a function which operates the compressor 1a at the speed of rotation according to the room load (air conditioning load) by changing the frequency of the electric currents supplied to the compressor 1a according to the difference between the room temperature detected by a temperature sensor and the temperature set on the control panel 71.

The control circuit 70 operates the indoor fan 64a and outdoor fan 66a along with the compressor 1a.

The control circuit 70 also has a function which operates the compressor 1a at a high speed of rotation when the control panel 71 is operated to stop the operation of the air conditioner (means of raising the speed of rotation of the compressor). The control circuit 70 stops the operation of the air conditioner, that is, the compressor 1a, outdoor fan 64a and indoor fan 66a after a predetermined time has elapsed (means for stopping the operation of the apparatus). This function increases the suction and discharge pressure difference Δ P to such an extent that the pressure difference Pd-Po becomes sufficiently high to quickly move the valve body 63 when the machine stops.

The operation of the compressor 1a is described below with reference to the flowchart shown in FIG. 3. When the control panel 71 is operated to turn on the cooling operation, the control circuit 70 makes the inverter drive the motor 5 of the compressor 1a with the frequency corresponding to the difference of the temperature between the room temperature detected by a temperature sensor and the temperature set on the control panel 71.

When the rotor 9 of the motor 5 begins to rotate, the rotation is transmitted by the shaft 7 to the oil pump 49.

Then the eccentric rotor 46 of the oil pump 46 is driven to rotate and moves the ring 48 in a plunging motion. The oil 51a in the oil reservoir 51 is sucked from the inlet of the oil pump 49 and disaccharide from the outlet. The oil 51a discharged by the oil pump 49 is supplied through the oil hole 50 to the portions of the compressing mechanism 6 where oil is required.

The rotation of the motor 5 is also transmitted to the rotary scroll 16 via the shaft 7, eccentric pin 27, and boss 19.

The rotary scroll 16 is then driven to revolve around the center of the stationary scroll 11 with the rotation around its center prevented by the Oldham's ring 28.

By the revolving motion of the rotary scroll 16, sealed spaces 20 formed between the stationary scroll 11 and rotary scroll 16 become smaller in volume as they move from the periphery to the center.

The refrigerant gas is introduced through the inlet pipe 30, low pressure section 4, opening in the main frame (not shown) and inlet opening (not shown) in the circumferential wall 14 into the space between the circumferential wall 14 and wraps 13 and 18, then taken into and confined in the sealed spaces 20.

The gas contained in the sealed spaces is compressed as the volume of the sealed spaces become smaller and pushed out into the outlet port 15 at the central portion.

Pushed by this discharged gas, the valve body 63 of the check valve 42 moves to the upstream first valve seat 61 to the downstream second valve seat 62 as shown in two-dot chain lines, opening the outlet port 15.

The discharged gas then enters the discharge chamber 43 through the branched portions of the outlet port 15 and flows out of the compressor 1a into the outlet pipe 44.

In the compressing mechanism 6, the pressure of the refrigerant gas in the high pressure space 36 (valve chamber 60) becomes the discharge pressure and that in the space 37 an intermediate pressure, and the gas pressure in the space 36 and space 37 cancels the pressure of the gas inside the sealed spaces 20 and thereby prevents the stationary scroll 11 from being pushed up by the inside pressure. Therefore, the gas confined in the sealed spaces 20 is compressed without leak of the gas.

The refrigerant gas from the compressor 1a thus begins to circulate through the outdoor heat exchanger 64 (condenser), expansion valve 65, indoor heat exchanger 66, and accumulator 67.

Then the control circuit 70 starts the operation of the outdoor and indoor fans 64a and 66a.

The refrigerant gas is thereby condensed in the outdoor heat exchanger 64 to extract cold from outside air and evaporated in the indoor evaporator 66 to release cold in the room.

Thus the room is cooled by the operation of a power according to the air conditioning load.

When the control panel 71 is operated to turn off the operation, the control circuit 70 issues the control signal which raises the speed of rotation of the compressor 1a. This high speed operation of the compressor 1a is maintained for a predetermined time.

The suction and discharge pressure difference Δ P is thus increased to such an extent that the pressure difference between both sides of the valve body 63 Pd-Po becomes sufficiently high to quickly move the valve body 63 when the operation is stopped.

This high speed operation of the compressor 1a before stopping the operation of the air conditioner ensures the pressure difference between both sides of the valve body 63 Pd-Po sufficiently high to quickly move the valve body 63 when the operation is stopped, even for the drying operation or cooling operation under a little temperature difference between the inside and outside air.

After the predetermined time has elapsed, the control circuit 70 issues the signals which stop the compressor 1a, outdoor fan 64a, and indoor fan 66a to stop the operation of the air conditioner.

When the operation of the air conditioner stops, the valve body 63 pressed to the second valve seat 62 is moved by the pressure difference between both sides of the valve body 63 to the first valve seat 61 surpassing the sticking force of oil as shown in solid lines in FIG. 1 and 2 and closes the outlet port 15.

Therefore, the delayed closing operation of the check valve 42 is prevented. As the result, the reverse rotation of the compressor 1a caused by the delay and the noise caused by the reverse rotation can also be prevented.

Further, since this embodiment just raises the speed of rotation of the compressor 1a of the air conditioner using a conventional inverter-controlled compressor for a predetermined time immediately before stopping the operation of the air conditioner, it therefore causes no cost increase.

Figure 4:
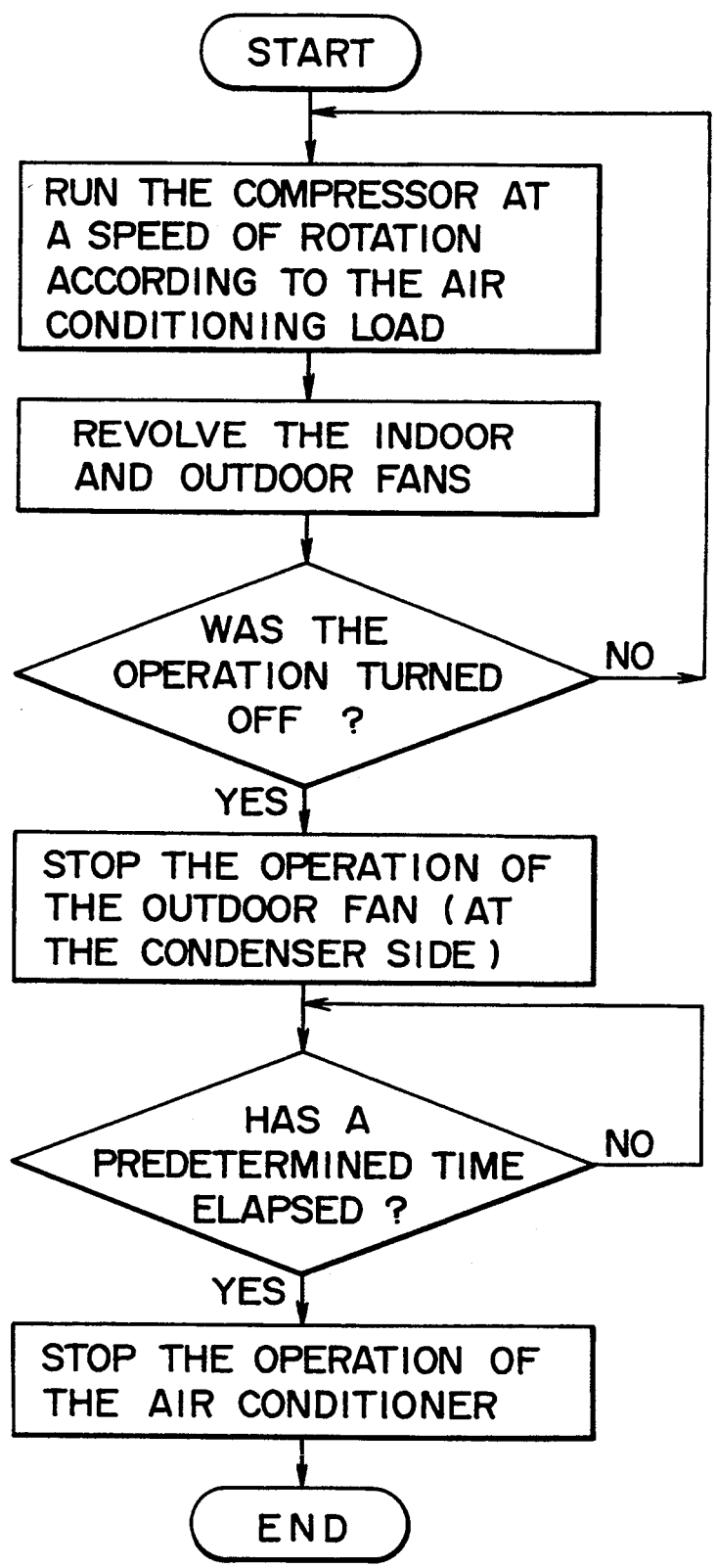
FIG. 4 is a flowchart showing the control of the operation of the outdoor fan for the second embodiment of this invention.
Figure 5:
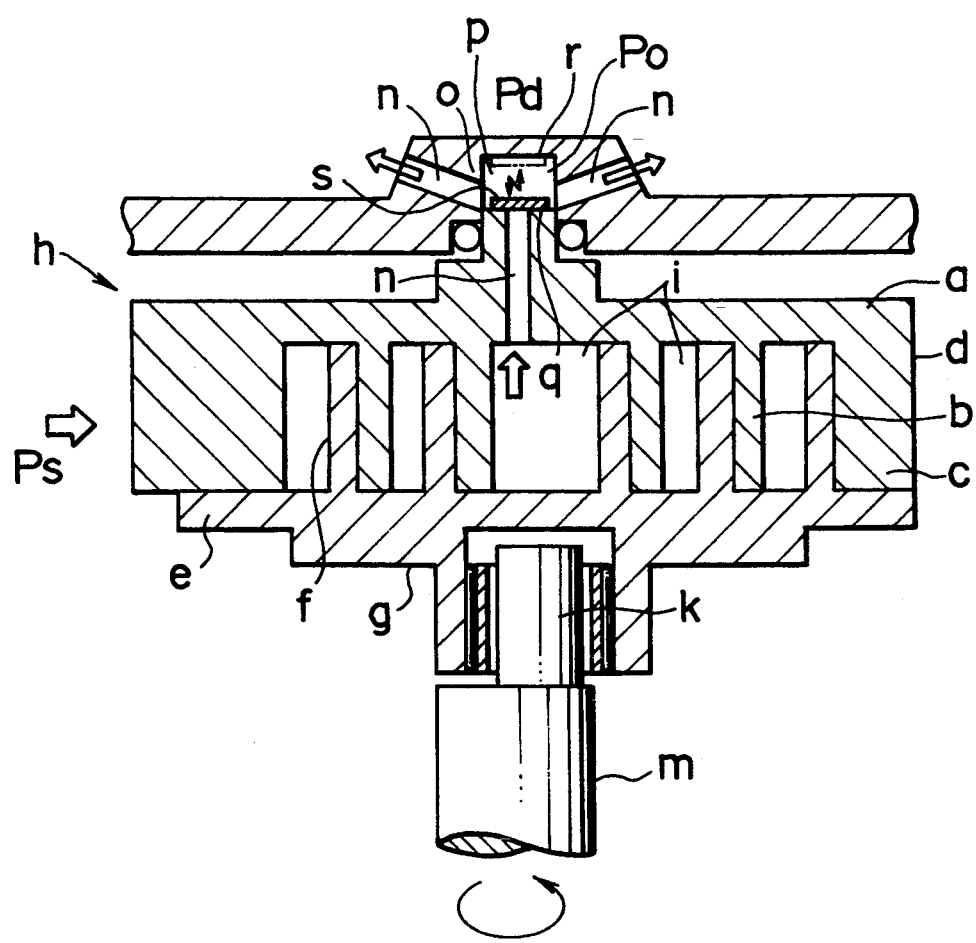
FIG. 5 is a sectional view showing the construction of the compressing mechanism of the compressor provided with a conventional check valve of free valve body type.

FIG. 4 shows the flowchart of the operation of the second embodiment.

Instead of raising the speed of rotation of the compressor 1a, this embodiment stops the outdoor fan 64 beforehand and then stops the air conditioner when a predetermined time has elapsed.

The control circuit 70 has a function which stops the operation of the outdoor fan 64a when the control panel 71 is operated to stop the operation of the air conditioner during the cooling operation (means of stopping the outdoor fan).

The control circuit 70 stops the operation of the air conditioner, that is, the compressor 1a, and indoor fan 66a when a predetermined time has elapsed after the outdoor fan 64a was stopped (means for stopping the operation of the apparatus).

When the control panel 71 is operated to stop the operation of the air conditioner, the control circuit 70 with the above functions first stops the outdoor fan 64a for the outdoor heat exchanger 64 (condenser), and then stops the compressor 1a and indoor fan 66a when a predetermined time has elapsed after the outdoor fan 66a was stopped.

If the outdoor fan 64a is stopped before the other devices are stopped, the gas pressure rises at the upstream side of the outdoor heat exchanger 64 due to the change of the condensation pressure caused by decrease of the heat exchange efficiency.

By this effect, the pressure difference between both sides of the valve body 63 Pd-Po becomes sufficiently high to move the valve body 63 to the first valve seat 61 surpassing the sticking force of oil, as in the above first embodiment.

Therefore, the valve body 43 of the check valve 42 is quickly moved to the closing position when the compressor 1a is stopped.

As the result, the delayed closing operation of the check valve 42 and hence the reverse rotation of the compressor 1a caused by the delay can also be prevented by this second embodiment.

Further, since this second embodiment just stops the outdoor fan 64a a predetermined time before stopping the other devices, it also causes no cost increase.

The construction of the air conditioner of the second embodiment is not shown because it is the same as that of the air conditioner of the first embodiment.

Although applications of this invention to air conditioners are described above as the embodiments of this invention, this invention can be applied to various heat exchange systems using a compressor provided with a check valve of free valve body type.

The invention defined in claims 1 and 2, as explained above, can generate the pressure difference between both sides of the valve body sufficiently high to move the valve body to the closing position surpassing the sticking force of oil when a heat exchange system stops.

Therefore, the valve body of the check valve can be moved to the closing position without a delay when the compressor is stopped. As the result, a return flow of the gas and the reverse rotation of the compressor caused by the return flow can be prevented.

Further, this invention causes no cost increase because it can be applied to conventional apparatuses.

We claim:

1. A refrigerating cycle machine comprising a compressor having a compressing mechanism provided at its outlet with a check valve and an inverter-driven motor for driving the compressing mechanism and other elements of a refrigerating cycle system connected in a closed loop, the check valve having a first valve seat on an upstream side of the outlet, a second valve seat on a downstream side of the outlet, and a valve body which is free to shift between the first and second valve seats and opens the outlet when a fluid pressure is applied from the upstream side and closes the outlet when the fluid pressure is applied from the downstream side, characterized by further comprising:
   means for raising a speed of rotation of said compressor when operation of the machine is turned off; and
   means for stopping operation of the machine when the high speed operation of said compressor is maintained for a predetermined time.

2. A refrigerating cycle machine comprising a compressor having a compressing mechanism provided at its outlet with a check valve and an inverter-driven motor for driving the compressing mechanism, a condenser, a fan for producing an air current through the condenser, and other elements of a refrigerating cycle system connected in a closed loop, the check valve having a first valve seat on an upstream side of the outlet, a second valve seat on a downstream side of the outlet, and a valve body which is free to shift between the first and second valve seats and opens the outlet when a fluid pressure is applied from the upstream side and closes the outlet when the fluid pressure is applied from the downstream side, characterized by further comprising:
   means for stopping said fan when, which has operated for heat exchange at said condenser, the operation of the machine is turned off; and
   means for stopping the operation of the machine when a predetermined time has elapsed after said fan was stopped.

* * * * *